United States Patent
Von Krosigk et al.

(10) Patent No.: US 6,593,279 B2
(45) Date of Patent: *Jul. 15, 2003

(54) ACID BASED MICRO-EMULSIONS

(75) Inventors: James R. Von Krosigk, San Antonio, TX (US); William M. Duncan, Jr., Corpus Christi, TX (US)

(73) Assignee: Integrity Industries, Inc., Kingsville, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/459,213

(22) Filed: Dec. 10, 1999

(65) Prior Publication Data

US 2002/0132740 A1 Sep. 19, 2002

(51) Int. Cl.$^7$ .............................. C09K 3/00; E21B 21/00; B01F 17/00
(52) U.S. Cl. ...................... 507/267; 507/255; 507/259; 507/261; 507/263; 507/265; 507/266; 507/269; 507/271; 507/277; 507/927; 507/929; 507/931; 507/933; 166/312; 510/188; 516/58; 516/73; 516/75; 516/76
(58) Field of Search .................................. 507/255, 259, 507/261, 263, 265, 266, 267, 269, 277, 271, 927, 929, 931, 933; 166/312; 510/188; 516/58, 73, 75, 76

(56) References Cited

U.S. PATENT DOCUMENTS

| | | | |
|---|---|---|---|
| 4,140,640 A | * | 2/1979 | Scherubel ................... 507/927 |
| 4,453,598 A | | 6/1984 | Singer et al. |
| 4,474,240 A | | 10/1984 | Oliver et al. |
| 4,511,488 A | | 4/1985 | Matta |
| 4,528,102 A | | 7/1985 | Oliver et al. |
| 4,588,445 A | | 5/1986 | Oliver et al. |
| 4,592,425 A | | 6/1986 | Oliver et al. |
| 4,604,233 A | * | 8/1986 | Rootsaert et al. ............ 507/927 |
| 4,676,916 A | * | 6/1987 | Crema ......................... 507/927 |
| 4,681,165 A | * | 7/1987 | Bannister ..................... 166/312 |
| 5,008,026 A | * | 4/1991 | Gardner et al. .............. 507/933 |
| 5,409,630 A | * | 4/1995 | Lysy et al. ................... 507/200 |
| 5,486,307 A | * | 1/1996 | Misselyn ....................... 516/76 |
| 5,549,840 A | * | 8/1996 | Mondin ......................... 516/76 |
| 5,552,089 A | * | 9/1996 | Misselyn ....................... 516/76 |
| 5,641,742 A | * | 6/1997 | Adamy ......................... 507/200 |
| 5,678,631 A | | 10/1997 | Salisbury et al. |
| 5,797,456 A | * | 8/1998 | Mokadam ..................... 507/933 |
| 5,854,193 A | * | 12/1998 | Mondin et al. .............. 507/200 |
| 6,017,868 A | * | 1/2000 | Mondin et al. .............. 507/200 |
| 6,020,296 A | * | 2/2000 | Mertens ........................ 507/200 |
| 6,022,834 A | * | 2/2000 | Hsu et al. ..................... 507/261 |
| 6,071,873 A | * | 6/2000 | Mertens ........................ 507/200 |

FOREIGN PATENT DOCUMENTS

| | | |
|---|---|---|
| EP | 0316726 A2 | 5/1989 |
| GB | 2144763 A | 3/1985 |
| GB | 2190681 A | 11/1987 |

* cited by examiner

*Primary Examiner*—Philip Tucker
(74) *Attorney, Agent, or Firm*—Vinson & Elkins L.L.P.

(57) ABSTRACT

Acid based micro-emulsions are disclosed comprising water, an acid blend, an anionic surfactant, a nonionic surfactant, a co-solvent, a solvent and an oxidizer. The micro-emulsions have particular utility in cleaning oil sludges and drilling mud residues from well cuttings, well formations and down hole and surface oil well drilling and production equipment.

44 Claims, No Drawings

ACID BASED MICRO-EMULSIONS

FIELD OF THE INVENTION

The present invention concerns acid based micro-emulsions of surfactants and solvents, and especially such micro-emulsions suitable for use as cleaning compositions in oil field applications.

BACKGROUND OF THE INVENTION

One aspect of this invention applies to the completion phase of oil and gas wells, which requires the use of substantially solids-free completion and/or packer fluids. If solids are present in the fluid, they can cause serious damage to a producing formation by plugging the formation pore spaces or the perforations and channels provided to permit fluid flow between the formation and the well bore. Solids in a packer fluid will eventually precipitate on the packer, making it difficult to connect or disconnect tubing from the packer, thus resulting in a costly well work over. In order to maintain a solids-free fluid, the surface equipment, well bore, casing, and the like, must be cleaned prior to introduction of the solids-free packer or completion fluid to the well bore.

Environmental regulations governing the disposal of oil and gas well drilling fluids have become increasingly restrictive. Such regulations have curtailed the use of conventional oil base muds ("OBMs"), which are based on petroleum products such as diesel or mineral oils, and have lead to the development of synthetic base muds ("SBMs"). Synthetic base muds are safer to the health of workers and to the environment. SBMs are more biodegradable and more dispersible in seawater or brine, than traditional oil base muds; however, they are more difficult to remove from the metal surfaces of drilling equipment. As used throughout this disclosure and claims, "oil," "petroleum," etc. are inclusive of their synthetic equivalents used in well drilling operations, SBMs, etc.

Certain solvent blends have been developed in an effort to remove SBMs during fluid displacement and well clean up processes U.S. Pat. No. 5,678,631 (Salisbury et al 1997 and others). However, the residual contaminants are difficult to remove due to any entrainead solids or metal surfaces being coated with a film of a "sticky" synthetic base fluid. In some wells, solids build up on the casing. Paraffin solids in some cases contribute to this solid build-up and can be difficult to remove.

Prior clean-up operations, typically done during the displacement process, made use of various surfactants and/or solvents for removing drilling muds and for cleaning drilling and well bore equipment. U.S. Pat. No. 4,453,598 (Singer, et al., Jun. 12, 1984); U.S. Pat. No. 4,474,240 (Oliver, et al., Oct. 2, 1984); U.S. Pat. No. 4,528,102 (Oliver, et al., Jul. 9, 1985); U.S. Pat. No. 4,588,445 (Oliver, et al., May 13, 1986); and U.S. Pat. No. 4,592,425 (Oliver, et al., Jun. 3, 1986) disclose processes for cleaning muds from drilling systems using a surface active agent/surfactant and an alcohol. The combinations of alcohols and surfactants disclosed have a number of disadvantages in that they are only surface active and do not destabilize the oil based mud emulsion in OBMs. Therefore, cleaning is inefficient since it requires the oil from the OBM or SBM to be physically adsorbed or emulsified into the cleaning solution. The combinations are also less effective in removing synthetic base muds from drilling equipment and well bores. Strictly solvents based or strictly water based formulations both suffer from this deficiency.

A second aspect of the acid based micro-emulsion central to the present invention is the cleaning of OBM and SBM drill cuttings. During the drilling process large amounts of drill cuttings (shavings) are produced and carried to the surface by the return of the OBM or SBM to the surface. These cuttings are coated with oily OBM or SBM emulsion and must be disposed of in an environmentally sound manner. Current environmental restrictions limit the operators to a narrow range of disposal options including, but not limited to, land farming, thermal desorption, enhanced biodegradation, solidification and cuttings injection. Washing of the drill cuttings is environmentally acceptable but not viable since current washing chemicals have been unable to remove the majority of the oil from OBM cuttings.

Through the investigation of the acid based micro-emulsions of the present invention, it has been determined that such acid based micro-emulsions used in a water washing operation destabilize the OBMs and SBMs and their emulsions that coat the cuttings' surface and water wet the solids, which allows for ease of separation of the oil, water and drill cuttings. The oil then can be recycled back to operations, the water recycled for reuse and the cleaned solids made available for disposal in a nonrestrictive environmentally sound manner.

A third aspect of this invention relates to the cleaning of surface oil field equipment including but not limited to storage tanks, sand removal equipment, produced sand and dirt and refinery sludges. The production of petroleum hydrocarbon, after the drilling process is complete, also results in the production of sand, dirt, clay and solids of varying compositions. These solids are natural to the subsurface environment and generally are held in suspension in an oil external emulsion produced naturally as a part of the production process. These solids are undesirable and are removed by several methods known well to the industry. These methods include but are not limited to chemical emulsion breaking, mechanical separation, filtration, centrifugation, the use of hydrocyclones and gravity separation. Through the investigation of the acid based micro-emulsions of the present invention, it has been determined that this invention has benefit as an emulsion breaker, solids wetter, sand cleaner and tank cleaner in surface petroleum operations.

Micro-emulsions are cleaning compositions generally comprised of a continuous phase of at least one aqueous surfactant component and a dispersed phase of one or more water-immiscible components, such as oils, fatty alcohols and/or terpenes. It is known that systems comprising a surfactant, water and these water immiscible components can assume different phase structures. Three types of phases, which comprise surfactant and water, are generally recognized: the rod phase, the laminar phase and the spherical micelle phase.

In the spherical micelle phase, surfactant molecules align in spheres having a diameter approximately twice the molecular length. For anionic surfactants in common use, these structures are less than 10 nm in diameter. Systems exhibiting this phase structure are clear, have a viscosity similar to water and cannot suspend particles.

The rod phase can be considered as a spherical phase, which has been encouraged to grow along one dimension. It is known that this can be achieved by the addition of oils. Typically, the rods grow to very large dimensions resulting in highly viscous solutions. Although the viscosity of these systems is high, suspended particles will eventually phase separate.

The laminar phase is (believed to be) characterized by the presence of extensive bi-layers of aligned surfactant molecules separated by water layers. These systems are generally of lower viscosity than the rod phase systems, can be opaque and can suspend particles.

When an oil or solvent is added to a surfactant-water system, the oil can remain in a separate phase or form part of a mixed phase. The so-called "micro-emulsions" are believed to be oil-in-water emulsions wherein the dispersed oil droplets are sufficiently small that a substantially visibly clear system results. These systems have a low viscosity and will not suspend particles, but differ from spherical micelles in that they exhibit low interfacial tensions in the presence of other oily materials such as oil based drilling fluids. It is believed that the low interfacial tension enables the micro-emulsions to spontaneously emulsify added oily materials, giving a particular cleaning benefit as compared with spherical micelles.

As will be appreciated, micro-emulsions have a similar overall composition to the rod micelle systems which can be obtained by adding oil to a spherical micelle system, but have a completely different phase structure and distinct physical properties. It is believed that in the micro-emulsions the dispersed oil phase is segregated into discrete spherical droplets each stabilized by a surfactant shell, whereas in the rod phase the oil phase is mixed with the surfactant to form a cylindrical mixed micelle structure.

Patents GB 2190681 (Colgate; 1987) and EP 316726 (Colgate; 1987) disclose systems which comprise both anionic and nonionic surfactants, together with a co-surfactant, a water-immiscible hydrocarbon such as an oily perfume and water. Surfactants may comprise solely anionic surfactants, although mixtures of anionics and nonionics are preferred. According to these texts (see page 5, lines 31 ff. of GB specification 2190681), the co-surfactant is essential in that in the absence of this component the surfactants and the hydrocarbon will form a non micro-emulsion phase structure. Suitable co-surfactants are said to include glycol ether solvents such as butyl carbitol, which is miscible with water, and butyl cellosolve, which is highly water soluble.

GB 2144763 (P&G; 1983) relates to micro-emulsion systems which contain magnesium salts. Examples demonstrate that aqueous liquid compositions can be prepared with anionic surfactants alone and with mixture of anionic and nonionic surfactants.

U.S. Pat. No. 4,511,488 (Penetone; 1985) relates to compositions which are described as clear, flowable compositions and which comprise 10–60 weight percent of d-limonene (a citrus oil), 10–30 weight percent surfactant, and 2–70 weight percent water, in the presence of a coupling agent such as a glycol ether solvent, in particular butyl carbitol. It has been found by experiment that these compositions are not stable and phase separate rapidly on standing.

The disclosures of the above-referenced publications and patents are hereby incorporated herein by reference.

From the above it can be seen that micro-emulsions generally comprise water, a surfactant mixture, an oil and a solvent. The surfactants are typically mixtures of anionic and nonionic surfactant. The oil is generally a perfume oil, such as d-limonene. The co-solvent is often referred to as a "coupling agent" and is generally a glycol ether.

No previous work is known to have resulted in stable acid based micro-emulsions suitable for cleaning operations such as the oil field treatments described herein.

SUMMARY OF THE INVENTION

In accordance with the present invention, a micro-emulsion acid based chemical additive is provided for cleaning well bores, formation cuttings and associated equipment. The micro-emulsion comprises an emulsified admixture of water, an acid blend, an anionic surfactant, a nonionic surfactant, a co-solvent, a solvent and, optionally, an oxidizer.

Micro-emulsions in accordance with the present invention are formed from these ingredients by blending the ingredients with a medium to high shear conventional blender common to the chemical industry. Preferably the water, acid, surfactants and co-solvents are first blended with shear to produce an intermediate mixture, prior to adding the solvent and other ingredients, and the solvent or oil generally last. Successful micro-emulsions also have been constructed with solvent addition prior to the micro-emulsification surfactant. The result is a substantially clear (in the absence of added colorants) oil internal micro-emulsion as opposed to a conventional opaque or translucent homogeneous mixture of solvent and water commonly referred to as "regular" or water internal emulsion.

A process is provided for cleaning a well drilling system including drilling mud pits, surface equipment, down-hole equipment, well cuttings and the well bore by utilizing the acid based micro-emulsion compositions of the present invention.

DETAILED DESCRIPTION OF THE INVENTION

Well drilling fluids and well systems and equipment become contaminated with mud weighing agents, sludge, paraffin, drill bit fines, pipe dope, solids deposited on casings, and other drilling residues. In situ-formed emulsions of petroleum-based components and water, as well as emulsions introduced with OBM or SBM drilling fluids, often coat these residues. When drilling with OBM or SBM, the solids present are generally and by design "oil wet." The oil-wet nature of the particles is preferred to provide weight, lubricity, filter cake deposition, shale stability and cuttings removal. However, it is preferred, and often necessary, that the well system be cleaned of used drilling fluids and mud solids, oils, and other drilling residues as part of the completion process. During well cleaning operations, it is preferable that these solids be "water wet" for ease of removal and for thorough well cleaning. Once the solids and residues have been removed, a solids-free completion and/or packer brine can be introduced into the well bore. In some cases the solids and residues have to be removed and the surfaces be rendered water wet when cementing is used to separate zones or stabilize tubulars. After completion, it may be desirable to re-clean the well system from time to time.

The present invention provides a micro-emulsion acid based chemical additive and a process for using the same to clean a well bore and its associated surface and down hole equipment. In the preferred embodiment, the micro-emulsion is added to the well after the gross displacement of the OBM or SBM and other loose residue by water flushing or other methods known in the industry. The emulsions preferably are used in an undiluted 100% active state, but also can be diluted if desired. The micro-emulsion has the advantageous property of destabilizing the residual oil mud emulsion and water wetting the displaced solids simultaneously. Current competitive products do not destabilize the residual oil mud emulsion but simply attempt to solvate or wash the solids. It is believed that the micro-emulsion of the present invention performs two key functions. One is destabilization of the in-situ formed and man made oil (including synthetic oil in the SBMs) external emulsions through the acid neutralization of the stabilizing agents carried through the oily layer by the micro-emulsion. Importantly and novelly, inclusion, in the preferred embodiment, of a strong oxidizer appears to act as a catalyst in the emulsion destabilization.

A second function performed by the micro-emulsion is to carry powerful surfactants, on a molecular level, to the surface of solids, thus water wetting them for ease of removal. Through this combination of destabilizing the in situ formed and man made emulsions coating the well components, formation cuttings, etc. and subsequently water wetting the solids, the micro-emulsions of the present invention make possible the removal of substantially all contaminating solids, such as sludge, pipe dope, paraffin, mud solids, and solid drilling residues from the well bore, drilling equipment and surface equipment. The micro-emulsion of the present invention also can be used to clean mud tanks, shakers, manifolds, and the like.

Testing of acid based micro-emulsions in accordance with the present invention has confirmed their usefulness as an emulsion breaker, solids wetter, sand cleaner and tank cleaner in petroleum operations.

The micro-emulsion preferably is a mixture of water, an acid blend, an anionic surfactant, a nonionic surfactant, a co-solvent, a solvent and an oxidizer. Water comprises from about 10 to about 70 weight percent. The acid blend is present at from about 1 to about 60 weight percent and more preferably from about 8% to about 16% by weight of the micro-emulsion. The surfactants are present at from about 1 to about 40 weight percent combined, with the anionic surfactant comprising from about 1 to about 25 weight percent and more preferably from about 12% to about 16% by weight of the micro-emulsion and the nonionic surfactant comprising from about 1 to about 25 weight percent and more preferably from about 2% to about 6% by weight of the micro-emulsion. The co-solvent is present at from about 1 to about 25 weight percent and more preferably from about 3% to about 16% by weight of the micro-emulsion. The oxidizer is present at from about 0.05% to about 1% by weight of the micro-emulsion. The solvent is present at from about 0.5 to about 40 weight percent and more preferably from about 5% to about 10% by weight of the micro-emulsion.

Suitable acids for use in preparing the micro-emulsion comprise hydrochloric, phosphoric, sulfuric, hydrofluoric, ammonium bifluoride, nitric, citric, oxalic, maleic, acetic, fumaric, malic, glutaric, or glutamic acids, as well as blends of such acids.

Anionic surfactants suitable for use in forming the micro-emulsions in accordance with the present invention comprise fatty acid soaps, alpha olefin sulfonate, sulfonates, amine ethoxylates, amine salts of linear alkyl benzene sulfonic acid, aromatic sulfonates comprising cumene, xylene and toluene sulfonate, earth metal salts of olefin sulfonate and alcohol sulfates and sulfonates, as well as blends of such anionic surfactants.

Nonionic surfactants suitable for use in forming the micro-emulsions in accordance with the present invention comprise ethoxylated nonionic surfactants selected from the group consisting of condensation products of ethylene oxide with aliphatic alcohols having from 8 to 22 carbon atoms in either straight or branched chain configuration as well as ethoxylated nonionic surfactants selected from the group consisting of condensation products of ethylene oxide with nonyl phenol, phenol, butyl phenol, di-nonyl phenol, octyl phenol or other phenols, as well as blends of such nonionic surfactants. Without limiting the generality of the foregoing, micro-emulsions which comprise one anionic and two non-ionic surfactants provide improved stability for the micro-emulsions.

Co-solvents (also sometimes referred to as "coupling agents") suitable for use in forming the micro-emulsions of the present invention comprise of n-butanol, iso-butanol, n-butoxyl propanol, ethers, di-propylene glycol, mono butyl ether, glycols including propylene glycol, ethylene glycol, butylene glycol, hexylene glycol, di-propylene glycol, di-ethylene glycol, tri-propylene glycol, triethylene glycol, poly glycols; ethers, including mono-methyl ether, and mixtures of such co-solvents. Micro-emulsions which comprise two or more co-solvents appear to possess improved stability.

Solvents suitable for use in forming the micro-emulsions in accordance with the present invention comprise limonene, d-limonene, terpenes, terpinol, pinenes, pentenes, para-cymene, di-butyl ether, butyl butyrate, amyl acetate, acetates, oleates, stearates, heptanoate, laurates, caprylates, adipates, butyrates, iso-butyrates, esters, diethers, olefins, alpha olefins, xylene, toluene, isoparaffins, two ethyl hexanol, hexanol and mixtures thereof.

Oxidizers suitable for use in forming the micro-emulsions of the present invention comprise potassium permanganate, sodium permanganate, calcium permanganate, peroxides and mixtures thereof.

Additional ingredients which do not detract from the efficacy of the micro-emulsions also may be included in the mixture. For example, cationic surfactants may be used in addition to the anionic and nonionic surfactants. A list of possible cationic surfactants comprises certain quaternaries, halogenated amines, complex amides and amido-amines and mixtures thereof.

In the preferred process for cleaning well bores by removing sludge, muds, mud solids, paraffin and other well drilling residue solids, the micro-emulsion will be added to the well as an undiluted slug or "pill" either as is or with a viscosifier added to produce a more viscous state, after most of the OBM or SBM has been displaced through conventional means common in the industry. Brine flushing is one such commonly used means. The cleaning effects of the micro-emulsion will be seen in the well bore through the destabilization of the residual oil mud which has been found to adhere to the drill pipe even after displacement with clear brine. Removal of this mud provides an added benefit since this residual oil mud has been found to cause problems in the cementing process as well in the completion process, causing build up in the producing zone. In the preferred process the drilling mud is first displaced by brine and then the micro-emulsion cleaning additive is pumped as a slug to displace the brine. A viscosifying agent such as hydroxy-ethyl cellulose may be added to provide a medium for increasing the weight of the cleaning agent.

As the acid based micro-emulsion encounters residual OBM or SBM, the same are destabilized and the residual solids are water wet for ease of removal.

When the micro-emulsion reaches a producing zone where filter cake is deposited, it destabilizes existing oil (including synthetic oil) based emulsions on the filter cake and penetrates the filter cake, further acting on the solids. This action is two fold, first penetration of the oil layer through the solvent micro-emulsion mechanism and then water wetting of underlying solids through acid and surfactant action.

The length of time and volume of the micro-emulsion required to clean a particular drilling system will be empirically determined based on an assumption of the residual oil mud left in the well bore, an estimated amount of filter cake, etc. Other variables may include the type of OBM or SBM used, the length of time the drilling process took, other contaminants that might be present in the well, the type of formation, the completion fluid used, the total depth of the well and the well configuration.

Once the micro-emulsion has had a chance to act on the well bore surfaces, filter cake and other contaminants, the micro-emulsion, together with the dislodged and dissolved solids and oil components preferably are washed from the well using water, either alone, or mixed with a diluted surfactant. A suitable surfactant for such water wash step would include Witco 1017, available from Witco Chemical Company, Houston, Tex. Witco 1017 comprises a blend of coconut oil acid esters and nonionic surfactants.

In addition to its down hole applications, the micro-emulsions in accordance with the present invention may be used in a batch wise or continuous process to clean OBM and SBM coated well cuttings. In such a process, the coated well cuttings and the micro-emulsion in accordance with the present invention would be mixed together in a suitable vessel with agitation. The emulsion destabilization effect is immediate and the oil will begin to separate and move to the surface due to the specific gravity differential. The solids will become water wet and are moved via a pump to a high-speed separation device such as a centrifuge or hydrocyclone for further separation. The clean solids are then available for nonhazardous disposal or disposition.

Other surface-based drilling equipment contaminated with oil sludge, OBM or SBM residues, etc. may be cleaned utilizing the acid based micro-emulsions. Such cleaning operations can be accomplished either by immersing the equipment in a tank of the micro-emulsion product or, if immersion is not practical, by washing the equipment utilizing a hose spray, pressure wash, etc. with either the undiluted micro-emulsion product or with a mixture of the micro-emulsion product and water.

The micro-emulsion in accordance with the present invention also can be used as an emulsion breaker in produced hydrocarbons. It may be added as a concentrate via pump directly into the produced hydrocarbon fluid. The emulsion destabilization effect is immediate and the oil will begin to separate and move to the surface due to the specific gravity differential.

Various nonessential components can be used in the micro-emulsion compositions of the present invention, where these are adapted to particular uses. These can be selected from the usual components employed such as perfumes, preservatives, coloring agents, antifoaming components, viscosity promoters, weighting agents, polymers and the like, provided that the micro-emulsion cleaning composition retains its micro-emulsion form when these components are added.

EXAMPLES

In order that the invention may be further understood, it will be described hereafter with reference to embodiments of the invention and comparative examples. In the following examples:

ME-29 is a mixture of an anionic amine salts of linear alkyl benzene sulfonic acid sulfonate and alcohol sulfate sold under the trade name ME-29 Terpene emulsifier by Expo Chemical Company, Inc. of Houston Tex.

HFT-1 is high flash terpene solvent sold under the trade name by Expo Chemical Company Inc. of Houston Tex.

DGMBE is di-ethylene glycol monobutyl ether available from numerous distributors worldwide.

DPG is di-propylene glycol available from numerous distributors worldwide NP-10 is nonionic nonyl phenol ten mole ethoxylate available from numerous distributors worldwide.

CI-72 is a proprietary acetic water soluble corrosion inhibitor sold by Integrity Industries, Inc. Kingsville Tex.

Megasurf S 100 is a nonionic mixture of condensation products of ethylene oxide with aliphatic alcohol distributed by Shrieve Chemicals, Inc. for Shell Chemical Co., Inc., Houston Tex.

NP-101 is nonionic nonyl phenol ethoxylate available from numerous distributors worldwide.

ME-91 is a mixture of an anionic amine salts of linear alkyl benzene sulfonic acid sulfonate and alcohol sulfate sold under the trade name ME-91 Terpene emulsifier by Expo Chemical Company, Inc. of Houston Tex.

D-Limonene is a natural terpene derived from citrus available from numerous distributors worldwide.

Texanol is 2,2,4 trimethyl-1,3-pentanediol mono-isobuteryate, sold under the trade name Texanol by Eastman Chemical Company, Kingsport, Tenn.

Table 1 presents the compositions, in weight percent, of six acid based micro-emulsion products prepared in accordance with the present invention:

TABLE 1

| | COMPONENT FORMULATION (WEIGHT PERCENT) | | | | | |
|---|---|---|---|---|---|---|
| | 1 | 2 | 3 | 4 | 5 | 6 |
| WATER | 67.6 | 50.5 | 50.5 | 50.6 | 48.5 | 48.5 |
| ACID BLEND | | | | | | |
| Hydrochloric Acid (32%) (26N) | 3.5 | 2.6 | 2.6 | 2.6 | 2.6 | 2.6 |
| Phosphoric Acid (85%) (44N) | 2.0 | 1.5 | 1.5 | 1.5 | 1.5 | 1.5 |
| Citric Acid Powder | 1.2 | 0.9 | 0.9 | 0.9 | 0.9 | 0.9 |
| Oxalic Acid Powder | 0.7 | 0.5 | 0.5 | 0.4 | 0.5 | 0.5 |
| Sulfuric Acid (98%) (37N) | — | 5.0 | 5.0 | 5.0 | 5.0 | 5.0 |
| ANIONIC SURFACTANT | | | | | | |
| ME-29 | 10.0 | 12.0 | 12.0 | 12.0 | — | 12.0 |
| ME-91 | — | — | — | — | 14.0 | — |
| NONIONIC SURFACTANT | | | | | | |
| NP-10 | 2.0 | 5.0 | — | — | — | — |
| NP-101 | — | — | 5.0 | 5.0 | 5.0 | 5.0 |
| Megasurf S-100 | — | 3.0 | — | — | — | 3.0 |
| Alpha-Olefin Sulfonate | — | — | 3.0 | 3.0 | 3.0 | — |
| CO-SOLVENT (Coupler) | | | | | | |
| DGMBE | 3.0 | 7.0 | 7.0 | 7.0 | 7.0 | 7.0 |
| DPG | 5.0 | 3.0 | 3.0 | 3.0 | 3.0 | 3.0 |
| SOLVENT | | | | | | |
| HFT-1 | 3.0 | 5.5 | — | — | — | — |
| D-Limone | — | — | — | — | 5.0 | — |
| Texanol | — | — | 5.5 | — | — | 2.0 |
| IPAR-3 Isoparaffin | — | — | — | 5.5 | — | 5.0 |
| OXIDIZER | | | | | | |
| Potassium Permanganate | — | 0.5 | 0.5 | 0.5 | 0.5 | 0.5 |
| OTHER | | | | | | |
| CI-72 | 2.0 | 3.0 | 3.0 | 3.0 | 3.0 | 3.0 |

Such compositions are prepared by blending the ingredients, preferably in a medium to high shear conventional blender commonly used in the chemical industry. Preferably the water, acids, surfactants and co-solvents are blended to form a first intermediate mixture, to which the solvent, oxidants and other components utilized are then added, with blending continued at medium to high shear until a substantially clear liquid micro-emulsion product is produced.

Formulation (2) is especially adapted for cleaning tubulars and filter cakes in drilling with an oil based drilling fluid because of its temperature stability, viscosity, and emulsion destabilization properties. Compositions 3 and 4 are especially suitable for use in offshore environments because they have an environmentally biodegradable and low toxic solvent/surfactant system. Compositions 5 and 6 are especially adapted for commercial cleaning use (e.g., tank bottoms, oil sand and drilling equipment) because they include solvent and surfactants known to provide grease and weathered oil removal.

Since the micro-emulsions prepared in accordance with the present invention are highly acidic, their use does entail some risk to personnel and care should be taken to protect personnel from direct exposure to the micro-emulsions. The acid based micro-emulsions also may have a tendency to cause corrosion on iron or steel based metal, a factor which should be considered in evaluating locations where they are used, duration of contact, etc. If desired, the acids utilized in preparing the micro-emulsions may be blended in a proprietary process known as ACID SHIELD, available through Integrity Industries, Inc., San Antonio, Tex. The ACID SHIELD process produces a nonvolatile strong acid blend which substantially reduces its corrosive effect on iron based metals and renders the acid blend substantially inert to human skin without diminishing its effective performance. ACID SHIELD is not necessary for the efficacy of the micro-emulsions, it merely provides an added safety feature.

The efficacy of micro-emulsions in accordance with the present application in breaking pre-existing oil and synthetic oil based emulsions and water wetting underlying solids has been demonstrated in the laboratory. Additionally, a large-scale refinery based test has been conducted in which 100-barrel truck loads of oil based bottom solids and sludge from refinery storage tanks were each mixed with 150 to 200 barrels of water. To this mixture was added 300 parts per million of acid based micro-emulsion in accordance with formulation 1 of Table 1 and the resulting mixture agitated in a 400-barrel cone-bottomed blend tank. The sludge emulsions broke immediately and the solids were water wet and began dropping through gravity separation to the bottom of the mixing cone. The solids then were conveyed to a three-phase centrifuge where the solids were removed. These solids proved to be 99.9% water wet and suitable for injection directly into the refinery coking unit without further treatment.

The foregoing disclosure and description of the invention are illustrative only and various changes may be made in the components, percentages and methods of use of the micro-emulsions, within the scope of the appended claims, without departing from the spirit of the invention.

What is claimed is:

1. A chemical composition comprising an emulsified admixture of:
   from about 10 to about 70 weight percent water;
   from about 1 to about 60 weight percent acid blend, the acid blend including at least one mineral acid and at least one organic acid;
   from about 1 to about 50 weight percent of a nonionic surfactant;
   from about 1 to about 25 weight percent of an anionic surfactant; and
   from about 0.5 to about 40 weight percent solvent.

2. The composition according to claim 1 comprising additionally from about 1 to about 25 weight percent of a co-solvent.

3. The composition according to claim 1 comprising additionally from about 0.05 to about 1.0 weight percent of an oxidizer.

4. The composition according to claim 1 wherein said nonionic surfactant and said anionic surfactant, combined, comprise not more than about 40 weight percent of said composition.

5. The composition according to claim 1 wherein said acid blend comprises from about 8 to about 16 weight percent of said composition.

6. The composition according to claim 1 wherein said anionic surfactant comprises from about 12% to about 16% by weight of said composition.

7. The composition according to claim 1 wherein said nonionic surfactant comprises from about 2 to about 6 weight percent of said composition.

8. The composition according to claim 1 wherein said solvent comprises from about 5 to about 10 weight percent of said composition.

9. The composition according to claim 2 wherein said co-solvent comprises from about approximately 3 to about 16 weight percent of said composition.

10. The composition according to claim 3 wherein said composition comprises a micro-emulsion.

11. A chemical composition comprising a micro-emulsified admixture of:
    from about 10 to about 70 weight percent water;
    from about 1 to about 60 weight percent acid blend, the acid blend including at least one mineral acid and at least one organic acid;
    from about 1 to about 25 weight percent of a nonionic surfactant selected from the group consisting of (1) condensation products of ethylene oxide with aliphatic alcohols having from 8 to 22 carbon atoms in either straight or branched chain configuration, (2) condensation products of ethylene oxide with a phenol, and (3) mixtures thereof;
    from about 1 to about 25 weight percent of an anionic surfactant selected from the group consisting of fatty acid soaps, alpha olefin sulfonate, sulfonates, amine ethoxylates, amine salts of linear alkyl benzene sulfonic acid, aromatic sulfonates, metal salts of olefin sulfonate and alcohol sulfates and sulfonates, and mixtures thereof which function as anionic surfactants; wherein the aromatic sulfonates comprise cumene, xylene, and toluene sulfonate;
    from about 0.5 to about 40 weight percent of solvent selected from the group consisting of limonene, d-limonene, terpenes, terpinol, pinenes, pentenes, para-cymene, di-butyl ether, butyl butyrate, amyl acetate, acetates, oleates, stearates, heptanoate, laurates, caprylates, adipates, butyrates, iso-butyrates, esters, diethers, olefins, alpha olefins, xylene, toluene, isoparaffins, two ethyl hexanol, hexanol, and mixtures thereof.

12. The composition in accordance with claim 11 comprising additionally from about 1 to about 25 weight percent of a co-solvent selected from the group consisting of n-butanol, iso-butanol, n-butoxyl propanol, n-butoxyl ethanol, glycols, ethers, and mixtures thereof; the glycols comprising propylene glycol, ethylene glycol, butylene glycol, hexylene glycol, di-propylene glycol, di-ethylene glycol, tri-propylene glycol, triethylene glycol and poly glycols; the ethers comprising mono-methyl ether and mono-butyl ether.

13. The composition according to claim 11 comprising additionally from about 0.05 to about 1 weight percent of an oxidizer selected from the group consisting of potassium permanganate, sodium permanganate, calcium permanganate and peroxide.

14. A chemical composition according to claim 11 comprising additionally from about 0 to about 10 weight percent of an cationic surfactant selected from the group consisting of quaternaries, halogenated amines, complex amides and amido-amines and mixtures thereof.

15. A micro-emulsion comprising a micro-emulsified admixture of:
from about 10 to about 70 weight percent water;
from about 1 to about 5 weight percent of a first surfactant selected from the group consisting of condensation products of ethylene oxide with aliphatic alcohols having from 8 to 22 carbon atoms in either straight or branched chain configuration;
from about 1 to about 5 weight percent of a second surfactant selected from the group consisting of condensation products of ethylene oxide and a phenol;
from about 8 to 15 weight percent of a third surfactant selected from the group consisting of fatty acid soaps, alpha olefin sulfonate, sulfonates, amine ethoxylates, amine salts of linear alkyl benzene, sulfonic acid, aromatic sulfonates, metal salts of olefin sulfonates, and mixtures thereof which function as anionic surfactants; wherein the aromatic sulfonates comprise cumene, xylene, and toluene;
from about 3 to about 16 weight percent of a co-solvent selected from the group consisting of n-butanol, iso-butanol, n-butoxyl propanol, n-butoxyl ethanol, glycols, ethers, and mixtures thereof; the glycols comprising propylene glycol, ethylene glycol, butylene glycol, hexylene glycol, di-propylene glycol, di-ethylene glycol, tri-propylene glycol, triethylene glycol and poly glycols; the ethers comprising mono-methyl ether and mono-butyl ether;
from about 5 to about 10 weight percent of a solvent selected from the group consisting of limonene, d-limonene, terpenes, terpinol, pinenes, pentenes, paracymene, di-butyl ether, butyl butyrate, amyl acetate, acetates, oleates, stearates, heptanoate, laurates, caprylates, adipates, butyrates, iso-butyrates, esters, diethers, olefins, alpha olefins, xylene, toluene, isoparaffins, two ethyl hexanol, hexanol, and mixtures thereof; and
from about 8 to about 16 weight percent of an acid comprising hydrochloric, phosphoric, sulfuric, hydrofluoric, ammonium bifluoride, nitric, citric, oxalic, maleic, acetic, fumaric, malic, glutaric, glutamic, and mixtures thereof.

16. The composition according to claim 15 comprising additionally from about 0.05 to about 1 weight percent of an oxidizer.

17. The composition according to claim 15 comprising additionally from about 0.1 to about 5 weight percent of an acid inhibitor.

18. The composition according to claim 15 wherein said second surfactant is selected from the group consisting of condensation products of ethylene oxide with nonyl phenol, phenol, butyl phenol, di-nonyl phenol and octyl phenol.

19. The composition according to claim 15 wherein said first surfactant is an ethoxylated fatty alcohol containing from 11 to 14 carbon atoms.

20. The composition according to claim 15 wherein said second surfactant is a nonyl phenol 10 mole ethoxylate.

21. The composition according to claim 15 wherein said third surfactant is an alpha olefin sulfonate.

22. The composition according to claim 15 wherein said third surfactant is a mixture of an amine ethoxylate and an amine salt of a linear alkyl benzene sulfonic acid.

23. The composition according to claim 15 wherein said third surfactant is a mixture of an amine ethoxylate and an alpha olefin sulfonate.

24. The composition according to claim 15 wherein said co-solvent is selected from the group consisting of butylene glycol, di-propylene glycol, and mixtures of butylene glycol and butoxyl ethanol.

25. The composition according to claim 15 wherein said solvent is selected from the group consisting of terpene, d-limonene, dipentene, 2,2,4-trimethyl-1,3-pentanediol mono-isobuteryate, mixtures of terpene and 2,2,4-trimethyl-1,3-pentanediol mono-isobuteryate, isoparaffins, alpha olefins, 2-ethylhexyl oleate, and mixtures thereof.

26. The composition according to claim 15 wherein said acid comprises a mixture of citric, oxalic, hydrochloric, and phosphoric acids.

27. The composition according to claim 15 wherein said acid comprises a mixture of sulfuric, citric, maleic, hydrochloric and phosphoric acids.

28. The composition according to claim 15 wherein said acid comprises a mixture of citric, maleic, hydrochloric, and phosphoric acids.

29. The composition according to claim 15 wherein said acid comprises a mixture sulfuric, citric, oxalic, hydrochloric, and phosphoric acids.

30. The composition according to claim 15 wherein said acid comprises a mixture of sulfuric, citric, oxalic, hydrochloric, ammonium bifluoride and phosphoric acids.

31. The composition according to claim 15 wherein said acid comprises a mixture of sulfuric, citric, oxalic, hydrochloric, hydrofluoric and phosphoric acids.

32. The composition in accordance with claim 16 wherein said oxidizer is potassium permanganate.

33. The composition according to claim 11 or 15 wherein said emulsified admixture comprises a substantially visually clear emulsion having a continuous phase and a dispersed phase, with said water, acid, surfactants and co-solvents, if used, comprising the continuous phase and said solvent comprising the dispersed phase.

34. A method for preparing a micro-emulsified well cleaning composition comprising admixing with continuous mixing from about 10 to about 70 weight percent water, from about 1 to about 60 weight percent acid, from about 1 to about 25 weight percent nonionic surfactant, from about 1 to about 25 weight percent anionic surfactant and from about 1 to about 25 weight percent of a co-solvent to provide a first intermediate mixture; and
adding to said first intermediate mixture, with continuous mixing, from about 0.5 to about 40 weight percent solvent and from about 0.05 to about 1 weight percent oxidizer, based on the final weight of said emulsion, and
continuing mixing until said components comprise a micro-emulsion.

35. A method for cleaning and water-wetting formation cuttings removed from a well bore, which formation cuttings are coated with petroleum based materials, said method comprising contacting said cuttings with a chemical composition comprising a micro-emulsified chemical composition according to claim 1, 11 or 15.

36. A method for cleaning and water wetting cuttings removed from a well bore which cuttings are coated with synthetic base drilling mud, said method comprising contacting said cuttings with a micro-emulsified chemical composition in accordance with claim 1, 11 or 15.

37. A method for cleaning a well bore comprising introducing into said well bore a micro-emulsified chemical composition in accordance with claim 1, 11 or 15.

38. A method for cleaning a well bore comprising circulating through said well bore a water wash;

subsequently introducing into said well bore a micro-emulsified chemical composition in accordance with claim 1, 11 or 15; and subsequently flushing said chemical composition from said well bore with a water flush.

39. The method according to claim 38 wherein said water wash additionally comprises a dilute surfactant.

40. The composition of claim 11 wherein said mineral acid is selected from the group consisting of hydrochloric acid, phosphoric acid, sulfuric acid, hydrofluoric acid, ammonium bifluoride, nitric acid, and mixtures thereof.

41. The composition of claim 11 wherein said organic acid is selected from the group consisting of citric acid, oxalic acid, maleic acid, acetic acid, fumaric acid, malic acid, glutaric acid, glutamic acid, and mixtures thereof.

42. A method for preparing a micro-emulsified well cleaning composition comprising admixing with continuous mixing from about 10 to about 70 weight percent water, from about 1 to about 60 weight percent acid blend including at least one mineral acid and at least one organic acid, from about 1 to about 50 weight percent of a nonionic surfactant, from about 1 to about 25 weight percent of an anionic surfactant, and from about 1 to about 25 weight percent of a co-solvent to provide a first intermediate mixture; and adding to said first intermediate mixture, with continuous mixing, from about 0.5 to about 40 weight percent solvent and from about 0.05 to about 1 weight percent oxidizer, based on the final weight of said emulsion, and continuing mixing until said components comprise a micro-emulsion.

43. A chemical composition comprising an emulsified admixture of:

from about 10 to about 70 weight percent water;

from about 1 to about 60 weight percent acid blend, the acid blend including at least one mineral acid and at least one organic acid;

from about 1 to about 25 weight percent nonionic surfactant;

from about 1 to about 25 weight percent anionic surfactant; and from about 0.5 to about 40 weight percent solvent.

44. A chemical composition comprising a micro-emulsified admixture of:

from about 10 to about 70 weight percent water;

from about 1 to about 60 weight percent of at least one of a mineral acid and an organic acid selected from the group consisting of hydrochloric, phosphoric, sulfuric, hydrofluoric, ammonium bifluoride, nitric, citric, oxalic, maleic, acetic, fumaric, malic, glutaric, glutamic, and mixtures thereof;

from about 1 to about 25 weight percent of a nonionic surfactant selected from the group consisting of (1) condensation products of ethylene oxide with aliphatic alcohols having from 8 to 22 carbon atoms in either straight or branched chain configuration, (2) condensation products of ethylene oxide with a phenol, and (3) mixtures thereof;

from about 1 to about 25 weight percent of an anionic surfactant selected from the group consisting of fatty acid soaps, alpha olefin sulfonate, sulfonates, amine ethoxylates, amine salts of linear alkyl benzene sulfonic acid, aromatic sulfonates, metal salts of olefin sulfonate and alcohol sulfates and sulfonates, and mixtures thereof which function as surfactants; wherein the aromatic sulfonates comprise cumene, xylene, and toluene sulfonate;

from about 0.5 to about 40 weight percent of solvent selected from the group consisting of limonene, d-limonene, terpenes, terpinol, pinenes, pentenes, para-cymene, di-butyl ether, butyl butyrate, amyl acetate, acetates, oleates, stearates, heptanoate, laurates, caprylates, adipates, butyrates, iso-butyrates, esters, diethers, olefins, alpha olefins, xylene, toluene, isoparaffins, two ethyl hexanol, hexanol, and mixtures thereof.

* * * * *